Patented Apr. 15, 1941

2,238,320

UNITED STATES PATENT OFFICE 2,238,320

PROCESS FOR PREPARING SECONDARY AMINES

Albert F. Hardman, Akron, Ohio, assignor to Wingfoot Corporation, Wilmington, Del., a corporation of Delaware No Drawing. Application May 28, 1938, Serial No. 210,770

6 Claims. (Cl. 260—576)

This invention pertains to a method of making secondary aromatic amines. More particularly, it relates to a method of preparing such amines by reacting a phenol and a primary aromatic amine in the presence of phosphoric acid.

It is one object of the invention to promote the reaction so that the desired products are formed in a shorter time and in higher yields. It is a further object of the invention to enable the reaction to be carried out, if desired, at substantially atmospheric pressure. It is also an object of the invention to minimize undesirable side-reactions and produce a product with a reduced amount of by-product impurities. Other objects and advantages will appear as the description of the invention proceeds.

Various methods are known for preparing secondary aromatic amines by reacting a phenol with a primary aromatic amine and some of these methods involve the use of a catalyst. Even in these cases, however, it is usually necessary or at least preferable to conduct the reaction in a closed autoclave under superatmospheric pressure in order to secure good yields. Moreover, the best yields obtainable by the known processes are not entirely satisfactory and it is desired to increase the same. It has now been discovered that superior yields may be obtained by the use of phosphoric acid, either as such or in the form of the aromatic amine salt, as a catalyst and that the use of this catalyst results in good yields even when the reaction is carried out at substantially atmospheric pressure.

Among the phenols useful in the practice of the invention are phenol, the cresols, alpha and beta naphthol, para amino phenol, hydroquinone, resorcinol, para hydroxy diphenyl, the nitro phenols, the chlor phenols, catechol, pyrogallol, guaiacol, thymol, etc., and mixtures thereof.

Among the primary aromatic amines which may be employed are aniline, the toluidines, the xylidines, and other alkyl substituted primary phenyl amines such as propyl, butyl, and amyl derivatives, the naphthylamines, the anisidines, the phenetidines, para amino diphenyl, the diamino benzenes, diamino diphenyl methane, the amino phenols, the chlor anilines, the nitranilines, etc., and mixtures thereof.

While the invention is applicable to any of the foregoing or similar materials, its advantages are particularly realized in the treatment of mixtures of hydroquinone and primary aromatic amines, especially aniline.

The practice of the invention is demonstrated by the following examples 1-10 in which the reacted materials are hydroquinone and aniline and the catalyst is ortho phosphoric acid.

Example 1

One hundred grams of aniline were placed in a flask with 110 grams (1 mol) of hydroquinone and 30 grams of aniline ortho phosphate (prepared by adding an excess of aniline to dilute ortho phosphoric acid, filtering and washing the product with ether). On heating, this mixture began to reflux at a temperature of about 200° C. The refluxing was controlled so that the water formed was constantly eliminated and the other materials were returned to the reaction. As the water was eliminated from the system the reflux temperature steadily increased until in about 2 hours it had risen to approximately 250° C. About 18 cc. of water had been collected. A second 100 gram portion of aniline was then slowly added through a dropping funnel, the reflux temperature being maintained at about 250° C. At the end of a total of five hours all the aniline had been added and 30 cc. of water collected. During the next four hours about 15 grams more aniline were added and an additional 5 cc. of water were collected, making the total water collected 35 cc. or 1 cc. less than the theoretical amount and making the total heating time 9 hours. The reaction mixture was then distilled at about 10 mm. pressure to obtain a yield of 197 grams of diphenyl para phenylene diamine boiling between 240° and 275° C. at 10 mm. pressure. This product, amounting to 76% of the theoretical yield, based on the hydroquinone, was light in color and of excellent quality.

Example 2

Hydroquinone and aniline were reacted in the same quantities and in the same manner as in Example 1 except that instead of the aniline ortho phosphate, the equivalent quantity of 85% ortho phosphoric acid (12½ grams) was used. The reaction proceeded in the same manner, 36 cc. of water being collected in 8 hours. The yield of diphenyl para phenylene diamine obtained on distillation weighed 192 grams which was 74% of the theoretical.

Example 3

One hundred and ten grams of hydroquinone and 230 grams of aniline, with 10 grams of 85% ortho phosphoric acid as a catalyst, were reacted as in Example 1 except that the reflux temperature was allowed to go to about 260° C. and was maintained at that temperature during the latter part of the reaction. Thirty-seven cc. of water were collected in 8 hours. The reaction mixture was heated a short time in vacuum until the excess aniline was distilled out and was then poured into a dish to cool. It crystallized to a firm brittle mass, which was pulverized to a gray powder melting at 137-138° C. This crude product weighed 236 grams.

Example 4

One hundred and ten grams of hydroquinone and 230 grams of aniline, with 12.5 grams of ortho phosphoric acid as a catalyst, were reacted by mixing the acid with about ⅓ of the aniline and then adding the hydroquinone and heating. The reflux temperature was allowed to rise to about 255° C. and was maintained at this temperature by slowly adding the remainder of the aniline. After 8 hours, 35 cc. of water had been collected. The reaction mixture was cooled to about 200° C. and poured with stirring into one liter of alcohol. By pouring quickly and stirring rapidly, all of the product was suspended in the alcohol before crystallization started but in a few seconds a thick mass of crystals was formed. After cooling, the crystals were filtered off, washed with about 500 cc. of cold alcohol, and dried. The product was a light tan powder melting at 142–143° C. and weighed 174 grams or 67% of the theoretical yield.

Example 5

The alcohol soluble material from Example 4, which included the catalyst, was reclaimed by distilling off the alcohol to yield a tarry residue, which was reacted with 110 grams of hydroquinone and 200 grams of aniline in a manner similar to that of the preceding examples. It was found that the reaction proceeded just as rapidly as with a fresh catalyst, 38 cc. of water being collected in 6 hours. This crude product was poured into a liter of alcohol and washed as in Example 4. One hundred and seventy-five grams of powder identical in appearance and melting point with that of Example 4 were obtained.

Example 6

The alcohol soluble residue from Example 5 was reclaimed by distilling off the alcohol and used with a fresh charge of hydroquinone and aniline. Again the reaction proceeded rapidly and smoothly, 40 cc. of water being collected in 6 hours heating at 225–260° C. The hot crude product was poured into alcohol to give 191 grams, or 73.5% of the theoretical yield, of product melting at 143° C.

Example 7

The accumulated alcohol soluble material from Examples 4, 5 and 6 amounted to 214 grams of a dark, semi-crystalline paste. This material was again treated with a fresh charge of hydroquinone and aniline. This time, the reaction was slower and only 34 cc. of water were collected in 8 hours heating. However, on pouring the product into alcohol as before, 194 grams, or 74½% of the theoretical yield, were obtained. The alcohol soluble material was collected by distilling off the alcohol and was then distilled at 10 mm. pressure to yield the following fractions:

| | Grams |
|---|---|
| Below 155° C. aniline | 38 |
| From 155–200° C. (probably diphenylamine) | 26 |
| From 200–240° C. p-hydroxy diphenylamine | 58 |
| From 240–270° C. diphenyl p-phenylene diamine | 65 |
| Residue | 61 |

The total diphenyl para phenylene diamine from Examples 4, 5, 6 and 7, including that recovered from the alcohol soluble material, weighed 799 grams or 76.8% of the theoretical yield based on the hydroquinone employed.

Example 8

Sixty grams of aniline, 110 grams of hydroquinone and 10 grams of ortho phosphoric acid were heated until the reflux temperature rose to about 250° C., at which temperature the reaction was maintained by slowly adding another 60 grams of aniline. In 45 minutes, 22 cc. of water had been collected. The crude product was distilled at about 10 mm. pressure to give the following fractions:

| | Grams |
|---|---|
| Below 190° (mostly hydroquinone) | 12½ |
| 190–240° C. para hydroxy diphenylamine | 117 |
| 240–275° C. diphenyl para phenylene diamine | 62½ |

The para hydroxy diphenyl amine obtained accounted for 63.3% of the hydroquinone while the diphenyl para phenylene diamine accounted for 24%. The combined yields of these two materials were thus 87.3% of the theoretical.

Example 9

Seventy-five grams of aniline, 110 grams of hydroquinone and 10 grams of ortho phosphoric acid were heated until the reflux temperature had risen to about 220° C. Refluxing was continued at 220–225° C. for 2 hours while slowly adding another 75 grams of aniline, a total of 20 cc. of water being collected. Distillation of the product at 10 mm. pressure gave the following fractions:

| | Grams |
|---|---|
| Below 190° C. aniline and hydroquinone | 84 |
| 190–240° C. para hydroxy diphenylamine | 126 |

The yield of para hydroxy diphenyl amine amounted to 68% of the theoretical and, like that obtained from Example 8, was very white and of good quality.

Example 10

A mixture of 110 grams of hydroquinone, 75 grams of aniline and 5 grams of aniline ortho phosphate (equivalent to 2.1 grams of ortho phosphoric acid) was refluxed until the temperature reached 255° C. Another 75 grams of aniline were then slowly added while maintaining the reflux temperature at 225–260° C. In 6½ hours, 27 cc. of water were collected. Distillation of the product at 10 mm. pressure resulted in the following fractions:

| | Grams |
|---|---|
| Below 200° C. | 27 |
| 200–240° C. para hydroxy diphenyl amine | 77 |
| 240–275° C. diphenyl para phenylene diamine | 115 |

The para hydroxy diphenyl amine obtained was equivalent to 41.6% of the hydroquinone and the diphenyl para phenylene diamine was equivalent to 44.3% of the hydroquinone, the two amounting to 85.9% of the theoretical yield.

Other phosphoric acids than ortho phosphoric acid may also be employed as catalysts in the invention. The following example illustrates the use of meta phosphoric acid.

Example 11

One hundred and ten grams of hydroquinone were reacted with 230 grams of aniline, using 6 grams of meta phosphoric acid as a catalyst, by heating the hydroquinone with about ⅓ of the aniline, refluxing with the elimination of water until the temperature reached 250° C. The temperature was then maintained at 250–255° C. by slowly adding the remainder of the aniline through a dropping funnel. In about 19 hours 34 cc. of water had been collected. The reaction mass was then cooled to 200° C. and poured into alcohol to give 189 grams or 72.8% of the theoretical yield of clean, crystalline product.

It may be seen from the foregoing example that although meta phosphoric acid is not quite so fast as ortho phosphoric acid, which is the preferred form of the catalyst, it is nevertheless possible to obtain good yields of a high purity product while operating at substantially atmospheric pressure. However, while other phosphoric acids may be used, best results are generally obtained by the use of ortho phosphoric acid and this is the preferred catalyst.

As previously stated, other amines and phenols than aniline and hydroquinone may also be employed in the practice of the invention. The following examples illustrate the use of some of these other mixtures.

*Example 12*

N-N'-diortho tolyl para phenylene diamine was prepared by reacting 250 grams of ortho toluidine with 110 grams of hydroquinone, using 10 grams of ortho phosphoric acid as a catalyst. The hydroquinone, the catalyst and about ⅓ of the toluidine were mixed and heated until the reflux temperature reached 250° C. The temperature was thereafter maintained at 250–260° C. by slowly adding the remainder of the toluidine through a dropping funnel. The reaction was continued for a total period of 8 hours during which time 36 cc. of water were collected. The molten reaction mass was poured into a liter of cold alcohol and the resulting crystals were filtered and washed. The final product, a light brown crystalline powder, melted at 135° C. and weighed 191 grams, which was equivalent to 61% of the theoretical yield.

*Example 13*

One hundred and ten grams of hydroquinone and 280 grams of mixed xylidines were reacted by mixing the hydroquinone with about ⅓ of the xylidines and 10 grams of ortho phosphoric acid and heating the mixture until the reflux temperature reached 250° C. The temperature was then maintained between 250 and 260° C. by slowly adding the remainder of the xylidines. Thirty-seven cc. of water were collected in 7½ hours heating. The liquid reaction product was poured into alcohol but because of the mixed nature of the product resulting from the use of mixed xylidines no crystals separated. The product was therefore treated by distilling off the alcohol and heating at a pressure of 5–10 mm. and a temperature of 235° C. until the excess xylidines were removed. The residue was cooled, yielding a soft resinous mass which weighed 260 grams. Assuming that this consisted of mixed dixylyl para phenylene diamines this yield corresponded to 82.3% of the theoretical.

There is usually less difficulty in reacting naphthols with aryl amines than there is in condensing monocyclic phenols with aryl amines and the invention is, therefore, particularly valuable for the treatment of monocyclic phenols, but the following example demonstrates that the practice of the invention is also advantageous when applied to such reactions of naphthols, resulting in high yields of clean pure crystalline products in a relatively short time.

*Example 14*

One mol (144 grams) of beta naphthol was reacted with 157.5 grams of aniline, using 5 grams of ortho phosphoric acid as the catalyst, by mixing the beta naphthol, the catalyst and about ⅓ of the aniline, refluxing the mixture and allowing the water formed to pass off. During the first hour and a half the temperature rose to 235° C. and 15 cc. of water were collected. During the next 15 minutes the temperature rose to 250° C. and then the remainder of the aniline was added slowly to maintain the reflux temperature at 250–260° C. while the heating was continued for an additional 5 hours. During the total reaction time of 6¾ hours, 18 cc. of water were collected. It may be observed that the greater part of the condensation, as measured by the water eliminated, took place during the first hour and a half. The reaction product was heated at 5–10 mm. pressure and 200° C. until the excess aniline was removed and was then allowed to cool. Two hundred and thirteen grams of a clean crystalline product melting at 108–109° C. were obtained. Assuming this to be substantially pure phenyl beta naphthylamine (M. P. 107.5–108° C.) this corresponded to a yield of about 96% of the theoretical.

The process of the invention may also be applied to the production of diaryl arylene diamines in which the aryl substituents differ from one another. The following Examples 15 and 16 illustrate the preparation of such products.

*Example 15*

N-phenyl N'-para tolyl para phenylene diamine was prepared by refluxing a mixture of 120 grams of para toluidine, 110 grams of hydroquinone and 10 grams of ortho phosphoric acid for about one hour until 18 cc. of water had been collected and the temperature had risen to 252° C. One hundred twenty grams of aniline were then slowly added through a dropping funnel, keeping the reflux temperature between 250 and 260° C. After a total heating period of 8 hours, 37 cc. of water had been collected. The reaction mass was cooled to about 200° C. and poured into one liter of cold alcohol, a crystalline product precipitating. These crystals were filtered off and washed and dried to give a final product melting at 145° C. and weighing 173 grams, which was equivalent to 63% of the theoretical yield.

*Example 16*

N-phenyl N'-ortho tolyl para phenylene diamine was prepared by refluxing a mixture of 120 grams of ortho toluidine, 110 grams of hydroquinone and 10 grams of ortho phosphoric acid for about one hour, at which time the temperature had risen to 260° C. and 18 cc. of water had been collected. One hundred and twenty grams of aniline were then slowly added through a dropping funnel, maintaining the reflux temperature at 250–260° C. After a total heating time of 8 hours, 37½ cc. of water had been collected. The reaction mass was poured into a liter of alcohol and the crystalline product, recovered by filtering and washing, melted at 110° C. and weighed 180 grams, which corresponded to about 66% of the theoretical yield.

It will thus be seen that, by the process of the invention, high yields of products having excellent purity can be obtained under very simple operating conditions. The foregoing examples are, however, to be considered as illustrative only and not as limitative of the invention. Thus, as previously stated, various other phenols and aryl amines may be substituted for those employed in the examples. Also, other phosphoric acids may be employed although ortho phosphoric acid is the preferred form of the catalyst. The operating conditions may likewise be varied and other temperatures and pressures and proportions of reactants may be employed. As in the examples, it will ordinarily be desirable to use a slight excess of the amine over equivalent proportions but other proportions of reactants and catalysts than those shown may be used if desired while still obtaining the desired reaction although, of course, use of proportions other than equivalent will modify the course of the reaction in accordance with the mass action effect and will necessitate elimination of excess reactants from the reaction product. In the particular case of the reaction of hydroquinone and aniline, reduction of the proportion of aniline will favor the formation of para hydroxy diphenyl amine while increasing the proportion of aniline will favor the production of diphenyl para phenylene diamine. The amount of catalyst employed will depend to a large extent upon economic factors, including the rate of reaction desired. Ordinarily, small amounts will suffice. In the specific case of the reaction of hydroquinone and aniline, larger amounts of catalyst up to about 10% by weight based on the hydroquinone seem to favor the production of diphenyl para phenylene diamine while smaller amounts, such as 1% or less, seem to favor the production of para hydroxy diphenyl amine. The temperatures may also be varied considerably although they will usually lie within the range from 220–280° C. and 250–270° C. is preferred. Furthermore, although the invention has been particularly described as practised at atmospheric pressure and this is a preferred form of the invention since it involves simplified equipment and procedures, the process may also be carried out at other pressures, as in an autoclave, while securing good results. Other variations in accordance with usual technique and procedure will obviously suggest themselves.

Thus, it will be apparent to those skilled in the art that various modifications may be made in the practice of the invention without departing from the spirit of the invention and the scope of the appended claims, in which it is intended to cover all features of patentable novelty residing in the invention.

What I claim is:

1. In a method of preparing secondary amines by the reaction of hydroquinone with a primary aromatic amine, the improvement which comprises carrying out the reaction in the presence of a phosphoric acid.

2. In a method of preparing secondary amines by the reaction of hydroquinone with a primary aromatic amine, the improvement which comprises carrying out the reaction in the presence of ortho phosphoric acid.

3. In a method of preparing secondary amines by the reaction of hydroquinone with a primary aromatic amine, the improvement which comprises carrying out the reaction in the presence of meta phosphoric acid.

4. In a method of preparing secondary amines by the reaction of hydroquinone with a primary aromatic amine of the benzene and naphthalene series, the improvement which comprises carrying out the reaction in the presence of a catalytic quantity of ortho phosphoric acid.

5. In a method of preparing secondary amines by the reaction of hydroquinone with aniline, the improvement which comprises carrying out the reaction in the presence of ortho phosphoric acid.

6. A method of preparing secondary amines which comprises reacting one to two mols of aniline with one mol of hydroquinone, the reaction being carried out at a temperature of about 220–280° C. and in the presence of ortho phosphoric acid.

ALBERT F. HARDMAN.